Jan. 21, 1947.  C. W. MOTT  2,414,602
AUXILIARY ELECTRIC POWER APPARATUS FOR TRACTORS
Filed Oct. 28, 1944  4 Sheets-Sheet 1

Jan. 21, 1947. C. W. MOTT 2,414,602
AUXILIARY ELECTRIC POWER APPARATUS FOR TRACTORS
Filed Oct. 28, 1944 4 Sheets-Sheet 3

Inventor:
Carl W. Mott,
By Paul O. Pippel
Attorney.

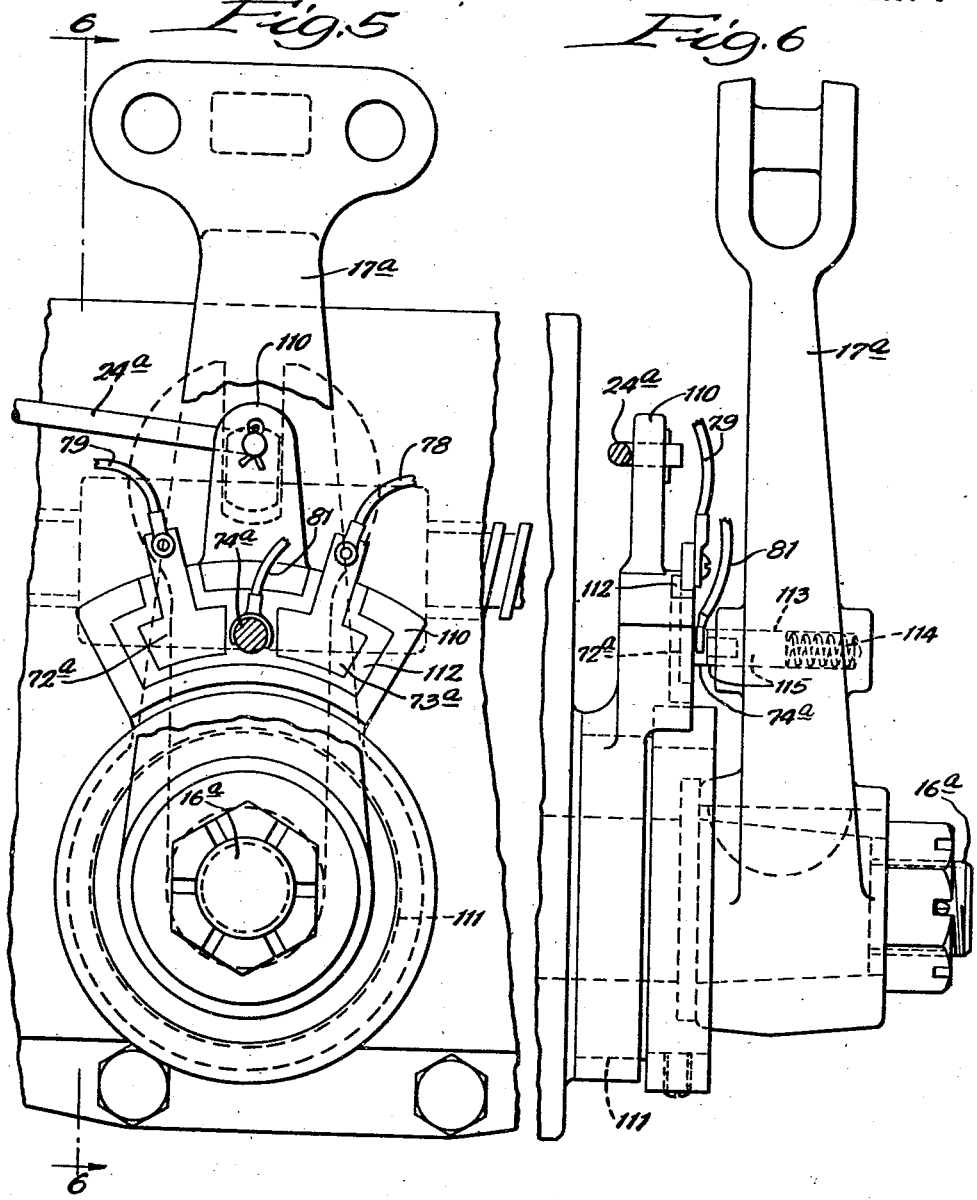

Patented Jan. 21, 1947

2,414,602

UNITED STATES PATENT OFFICE 2,414,602

AUXILIARY ELECTRIC POWER APPARATUS FOR TRACTORS

Carl W. Mott, La Grange, Ill., assignor to International Harvester Company, a corporation of New Jersey Application October 28, 1944, Serial No. 560,808

14 Claims. (Cl. 97—50)

This invention concerns apparatus utilizable as a power lift upon tractors or the like and relates more particularly to such an apparatus adapted to receive driving force from an electric starting motor for the tractor engine.

The present invention is especially suited for use upon small tractors since the power required for lifting and adjusting the correspondingly smaller and lighter soil-working tools therefor does not exceed that attainable from a storage battery of a desirable capacity for serving starting, lighting and ignition systems of the vehicle. Cumulatively, these manifold uses for a generator-battery electric system economically justify its installation upon the small tractor. While an electric starting motor is a desirable convenience, the cost of this motor together with the battery and other accessory parts of the electric system, in comparison to the small tractor itself, have heretofore caused this auxiliary equipment to be regarded more or less as a luxury. When, however, it becomes possible to employ a tool lifter and adjuster effectively powered by a generator-battery electric system, installation of the system is economically justified, and use of the electric starting, lighting and ignition equipment becomes practicable.

A general object of this invention is the provision of an inexpensive electrically energized auxiliary power device for adjusting tools associated with a tractor. Electrically energizing the device from a storage battery on the tractor makes it possible for operation irrespective of whether the tractor engine is running.

Another object is the provision of an electrically energized auxiliary power device controllable to selectively crank the tractor engine or to operate tools or the like.

Another object of the invention is the provision of such an auxiliary power device carried on an intermediate body portion of the tractor and embodying a transverse rock-shaft, an electric motor, and gearing selectively disposable to connect the motor in driving connection with the rock-shaft or with the engine starting gear. This gearing preferably includes alternatively driven countershafts extending fore and aft of the tractor and respectively connected with the engine starting gear and threaded to operate a traveling nut which is drivingly connected with the rock-shaft.

Another object is the provision of an electric circuit control for the motor whereby a manually adjustable component determines the direction of motor operation, and a motor-driven component causes the motor to stop after operation in either direction an amount correlated with the amount the manual component is moved or adjusted.

The above and other desirable objects, capabilities and advantages inherent in and encompassed by the invention will become apparent from the ensuing description and the drawings wherein:

Fig. 5 is a fragmentary side elevational view of a modified form of electric circuit control utilizable with the device; and Fig. 6 is a view taken on the line 6—6 of Fig. 5.

Figure 1:
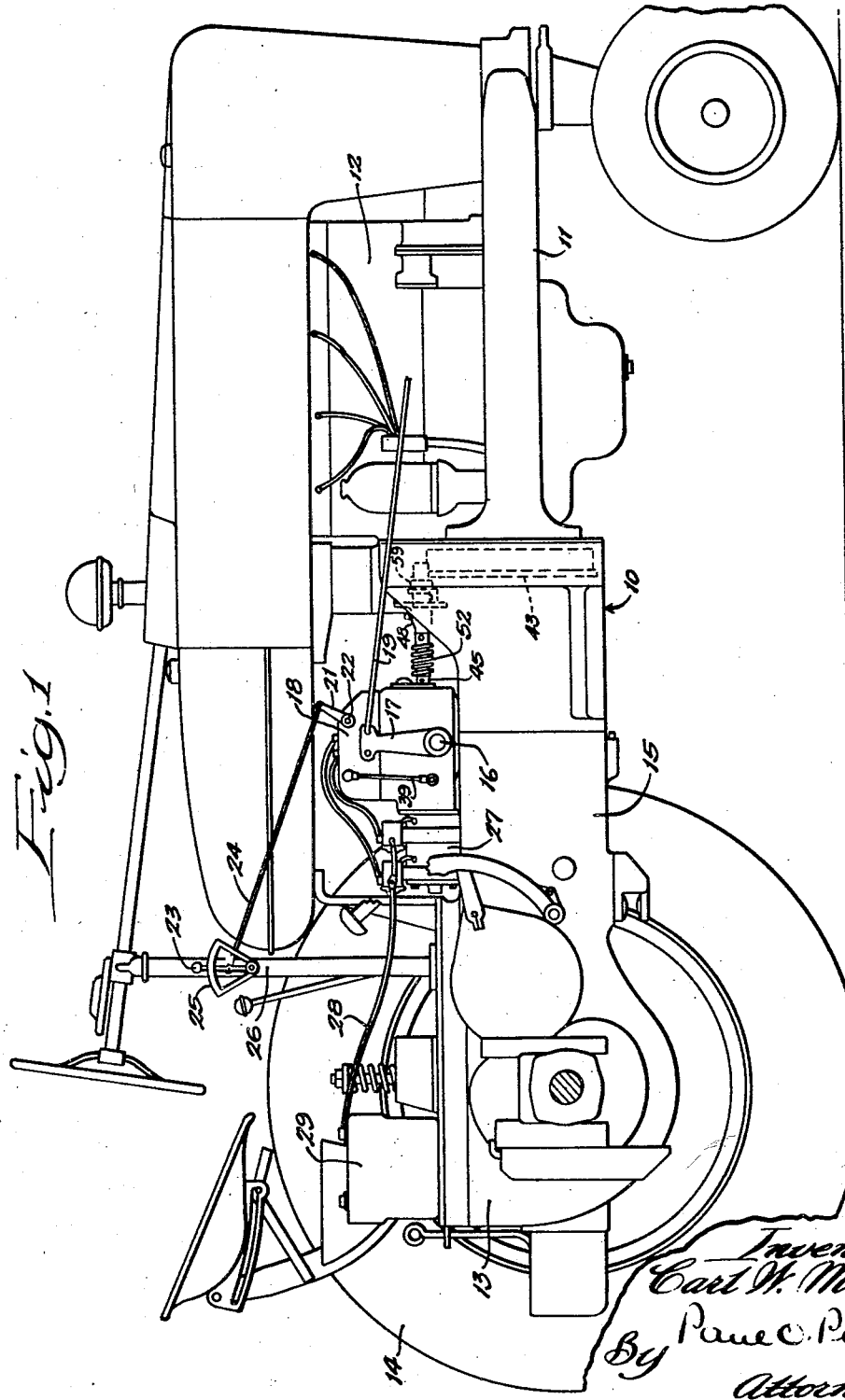
Fig. 1 is a side elevational view of a tractor having one embodiment of the invention installed thereon.
Figure 2:
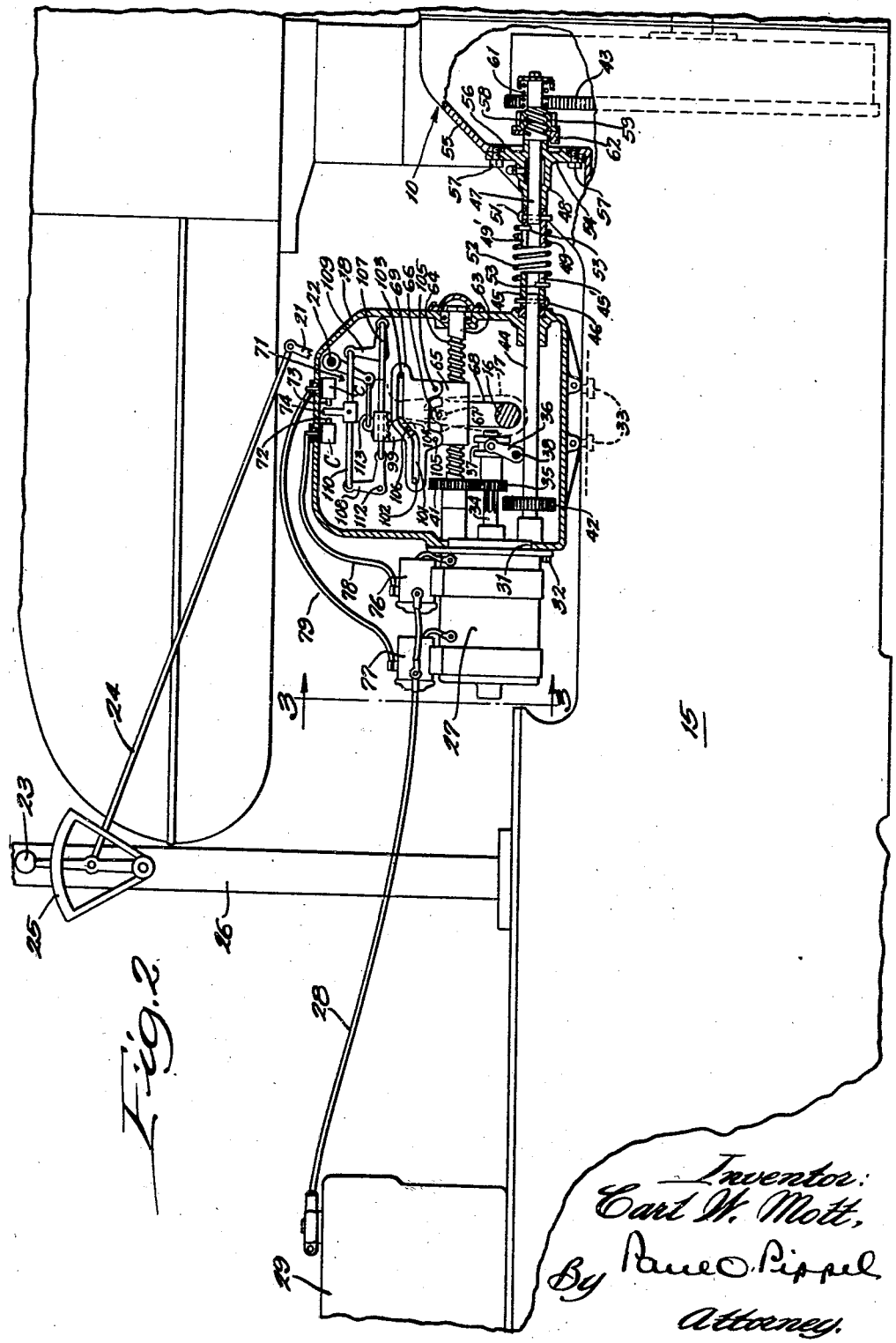
Fig. 2 is an enlarged view showing the mid-portion of the tractor body and the device mounted thereon, with a side wall of its casing broken away for illustrating shafting and gearing therein, which shafting and gearing are viewed as indicated by the section line 2—2 in Fig. 3.
Figure 3:
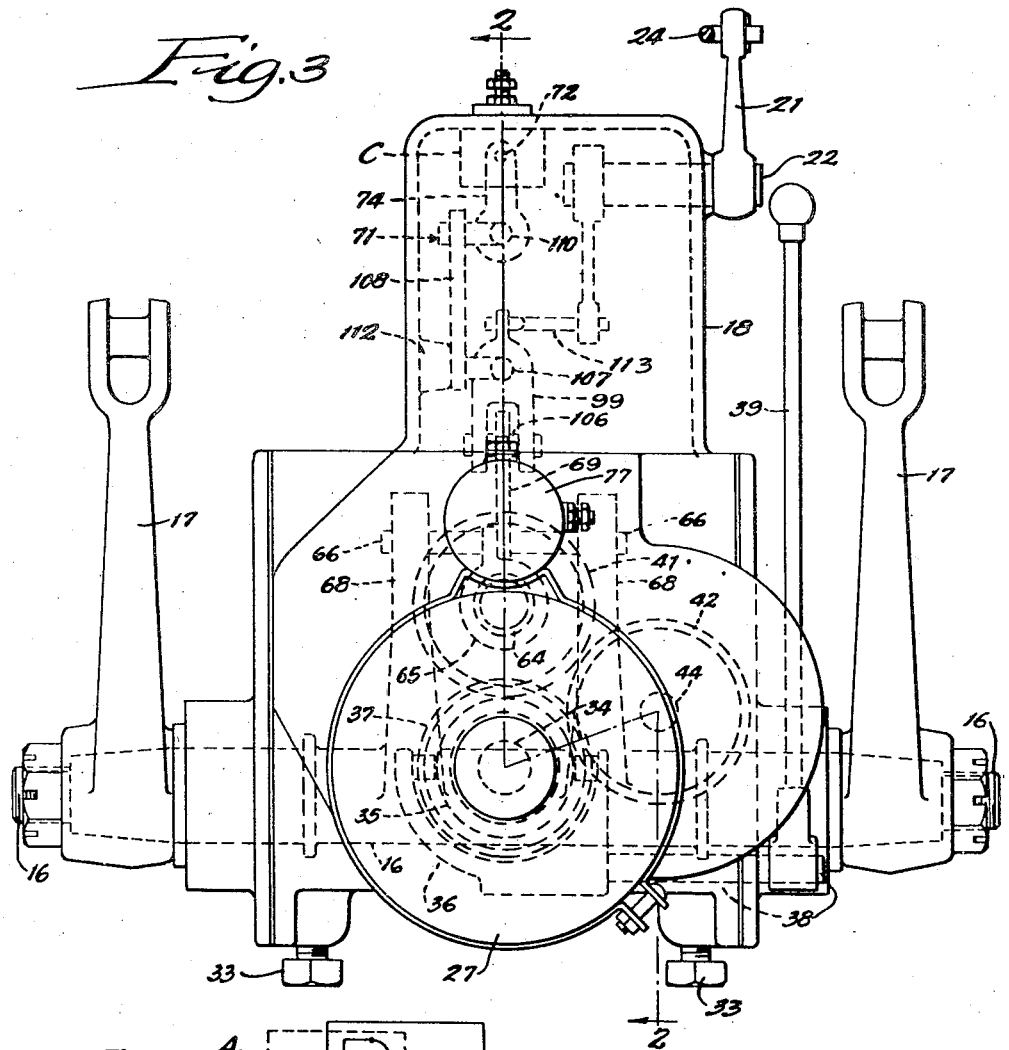
Fig. 3 is an end elevational view of the device taken on the line 3—3 of Fig. 2.

With continued reference to the drawings in Fig. 1 there is shown a tractor including a body 10 wherein there is a front portion 11 carrying an engine 12, a rear portion 13 carrying laterally spaced traction wheels 14, and a mid-portion 15 upon which the device constituting the present invention is mounted. The device, as can be seen from Figs. 1, 2, and 3, includes a rock-shaft 16 having arms 17 upon opposite of its ends which are at opposite sides of a casing 18, and which arms 17 are to be rocked or oscillated with the shaft 16 for producing endwise movement of tool-operating rods 19. It is one purpose of the present invention to provide manually controlled power-operated means for causing the rock-shaft 16 and the arms 17 to rock in either direction coordinately in direction and amount with the fore and aft pivotal movement of a lever 21 which rotates about a stub shaft 22 which is shown in Fig. 2. Movement of the lever 21 is controlled by a hand lever 23 which is connected to the lever 21 by a link 24 and operates over a quadrant 25 mounted upon a steering wheel supporting standard 26.

The device is driven by an electric motor 27 which receives electric energy through a conductor in a cable 28 connected with the ungrounded terminal of a storage battery 29. The motor 27 is secured to the back end of the casing 18 in registry with a back wall casing opening 31 by means of bolts 32, and the casing 18 is securely attached to the tractor body portion 15 by means of bolts 33.

The armature shaft 34 of the motor projects forwardly into the casing 18 and is splined for constraining a gear 35 to rotate therewith while permitting this gear to be moved endwise of the shaft. Endwise movement of the gear 35 is accomplished by a shifter fork 36 cooperable with a groove 37 in the hub of the gear and manually rockable with a shaft 38 which carries a gear shifting lever 39 upon a portion thereof externally of the casing.

Shiftable gear 35 is shiftable into the position shown where it meshes with a gear 41 or to a more rearward position where it meshes with a gear 42. When the gear 35 is meshed with the gear 41, it is operable upon energization of the motor 27 to rock the rock-shaft 16 as will presently be described, and when the gear 35 is meshed with the gear 42, it is operable upon energization of the motor for driving the starting gear 43 of the tractor engine.

Gear 42 is constrained for rotation with an engine-starting gear driving shaft 44 journaled at opposite of its ends in the rear and front walls of the casing 18. An axially notched collar 45 is secured to the front end of the countershaft 44 by a pin 46 in such a fashion that a forward portion of this collar projects forwardly beyond the end of the countershaft. A pinion shaft 47 journaled in a flanged bearing member 48 also has an axially notched collar 49 secured thereto by a pin 51 in such a manner that the back end of this collar projects rearwardly from the rear end of the shaft 47 in opposed coaxial relation with the collar 45. A yieldable universal articulate driving connection is established between the collars 45 and 47 by a helical spring 52 having radially inturned end portions 53 respectively projecting into the axial grooves 45' and 49' of the collars. The flanged part 54 of the bearing 48 is secured to the bell housing 55 of the tractor body in registration with an opening 56 by means of cap screws 57. This opening 56 affords the entrance into the bell housing of the threaded front end portion 58 of the shaft 47. A starting gear pinion 59, of conventional construction, upon the high pitch threads of the section 58 and meshed therewith is normally held in an axially retracted position from the ring gear 43 by a compression spring 61. An eccentrically weighted portion 62 upon the hub of the pinion 59 causes this pinion to resist rotation with the shaft 47 so that when this shaft is rotated quickly in a counterclockwise direction, as viewed from its front end, the inertia of the weight 62 and of the pinion 59 will cause the threaded shaft portion 59 to rotate relatively to the pinion and thereby advance it forwardly into mesh with the starting ring gear 43 preparatory to driving the same for cranking the vehicle engine pursuant to continued rotation of the pinion. Employment of the helical spring coupling 52 between the shafts 44 and 47 results in absorption of some of the shock which would otherwise be transmitted from the shaft 44 to the starting pinion 59. Coupling spring 52 is also capable of compensating for slight misalinement between the shafts 44 and 47.

The gear 41 is constrained for rotation with a countershaft 63 having opposite end portions journaled in the front and back walls of the casing 18 and formed with a helical thread 64 of high pitch. This threaded portion 64 of the countershaft 63 is meshed with internal threads (not shown) of a traveling nut 65. Rotation of the nut 65 about the axis of countershaft 63 is prevented by a pin 66 projecting laterally from the nut into a slot 67 in the upper end of an arm 68 constrained for rotation with the rock-shaft 16. When the nut 65 is caused to move axially of the shaft 63 during rotation of this shaft, a side of the slot 67, depending upon the direction of axial advancing of the nut, will be pressed upon by the pin 66 to impart rocking movement to the arm 68, rock-shaft 16, and the two arms 17 upon the ends of the shaft 16 exteriorly of the casing 18.

Traveling nut 65, in addition to moving the rock-shaft 16, operates one component 69 of a device 71 for controlling the electric circuit which controls energization of the electric motor 27. This control circuit includes spaced apart fixed electrical contacts 72 and 73 laterally engageable by a movable contact 74. Fixed contacts 72 and 73 are connected to the windings 75 of magnetic switch devices 76 and 77 by conductors 78 and 79; see Figs. 2 and 4. The movable contact 74 is connected to the ungrounded side of the battery 29 by a conductor 81. The terminals of the magnetic device windings 75 opposite to those connected with the conductors 78 and 79 are grounded as indicated at 82 in Fig. 4.

Figure 4:
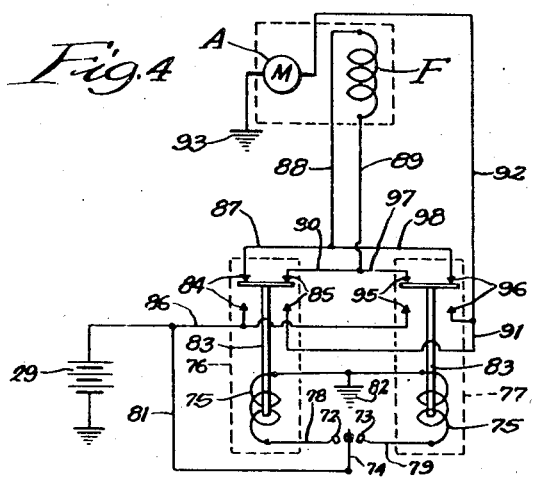
Fig. 4 is a wiring diagram illustrating a system of electric circuit connections which may be employed in the device.

The motor 27 is assumed to be a direct current with a series-connected field winding. In Fig. 4 the motor armature is designated A and the field winding is designated F. When the movable contact 74 engages contact 72, current will flow from the battery through the conductor 81, the closed contacts 72 and 74, and the winding of the magnetic device 76 to ground at 82, moving the armature 83 of such device for engaging contact pairs 84 and 85. Thereupon current will flow from the ungrounded terminal of the battery through conductor 86, closed contact pair 84, conductors 87 and 88, motor field winding F, conductors 89 and 90, contact pair 85, conductors 91 and 92, and through armature A to ground at 93. This energization of the motor armature and field windings will cause the motor armature shaft 34 to rotate clockwise as viewed from its front end, thereby imparting counterclockwise rotation to the gear 41 (when the gear 35 is meshed with the gear 41) and to the threaded shaft 63. Counterclockwise rotation of the countershaft 63 will cause the traveling nut 65 to move forwardly and to pivot the rock-shaft 16 clockwise as viewed in Fig. 2. Operation of the motor and rocking of the rock-shaft 16 will continue so long as the contacts 74 and 72 are engaged. Upon disengagement of the contacts 74 and 72, the magnetic device 76 will deenergize and the contact pairs 84 and 85 separate for causing the motor to stop. Upon stopping of the motor, the rock-shaft 16 will be held against rotation by the traveling nut 65 and the countershaft 63. Driving of the motor 27 and of the rock-shaft in the opposite direction is accomplished by causing engagement of the contacts 74 and 73. Upon such engagement of the contacts 74 and 73, current will flow from the ungrounded terminal of the battery through the conductor 81, contacts 74 and 73, conductor 79, and winding 75 of the electric magnetic device 77 to ground at 82. This causes the armature 83 of the device 77 to close the contact pairs 95 and 96 whereupon current will flow from the ungrounded terminal of the battery through conductor 86, contact pair 95, conductors 97 and 89, the field winding F (in the opposite directic to which the current flowed through this fielc winding when the magnetic device 76 was energized), the conductors 88 and 98, contact pair 96, conductor 92, and the armature winding of the motor to ground at 93. Because of the field winding of the motor having current pass through it in the opposite direction, the motor will operate in the opposite direction; that is, its armature 34 will rotate counterclockwise as viewed from the front, causing clockwise rotation of the gear and the threaded countershaft 63. Consequently the rock-shaft 16 will be rocked counterclockwise as viewed in Fig. 2. This operation of the motor and movement of the rock-shaft will continue until the contacts 73 and 74 are separated for deenergizing the magnetic device 77 and opening the connections at 95 and 96 in the motor energizing circuit.

In addition to the motor-driven component 69 of the means 71 for controlling the control circuit contacts 72—73—74, there is a manually operated component 99. Motor-driven component 69 is in the form of a cam having an elongated slot 101 with parallel end portions 102 and 103 which are offset vertically and connected at their inner ends by a diagonal slot portion 104. This member 69 is attached to the traveling nut by pins 105. The manually operated component 99 of the electric circuit controlling device 71 is in the form of a cam follower comprising a pin 106 which rides within the slot 101. This follower member 99 is slidably mounted upon a horizontal rod 107 and when moved vertically will impart transverse vertical movement to said rod. Opposite ends of the rod 107 are pivotally connected to horizontal legs of bell-cranks 108 and 109, while a second horizontal rod 110 is pivotally connected with the vertical legs of said bell-cranks. Fixed pivots 112 are provided for the bell-cranks at the junctures of their legs. Movable contact 74 is fixed upon the rod 110 so that when this rod is moved endwise in one direction or the other this contact will be moved from a neutral position where it engages neither of the contacts 72 and 73 into position for contacting one or the other thereof. These contacts 72 and 73, while permanently electrically connected with their respectively associated conductors 78 and 79, are yieldably endwise movable within small casings C so that the contact 74 can continue limited movement endwise with the rod 110 after contact is made with either of the so-called "fixed" contacts 72 and 73.

In the operation of the apparatus for controlling the electric control circuit, should the operator desire to cause the motor 27 to operate in the direction for pivoting the rock-shaft 16 clockwise as viewed in Fig. 2, he will pull rearwardly upon the hand lever 23 in Fig. 1, causing the upper end of the lever 21 to move rearwardly and the lower end of the lever 21 to move forwardly and to thereby, through a link 113, move the cam follower member 99 forwardly, camming this member 99 upwardly along the lower edge of the diagonal slot portion 104. Prior to this upward movement of the member 99, its pin 106 occupied a mid position between the ends of the diagonal slot portion 104, but this upward movement of the member 99 will impart upward movement to the rod 107 and counterclockwise rotation of the bell-cranks 108 and 109 and endwise movement of the rod 110 to the left, whereby the contact 74 is carried into engagement with the contact 72. When the contacts 72 and 74 are thus closed, the magnetic device 76 is energized for causing clockwise rotation of the motor armature shaft 34, as viewed from the front, and, as explained hereinabove with reference to Fig. 4, this clockwise rotation of the armature shaft and of the gear 34 causes counterclockwise rotation of the gear 41 and the threaded countershaft 63 whereby the traveling nut 65 will be advanced forwardly, causing clockwise rotation of the rock-shaft 16. Presently this movement of the traveling nut and of the cam plates 69 to the right will reestablish the cross pin 106 in the mid position within the diagonal slot portion 104 incident to moving the rod 107 downwardly and pivoting the bell-cranks 108 and 109 clockwise for withdrawing the contact 74 from the contact 72. When this occurs the motor 27 will stop after having driven the rock-shaft 16 a distance corresponding to the distance the follower member 99 had been advanced lengthwise of the rod 107 and of the cam slot portion 103. This lengthwise movement of the cam follower 99 is proportional to the movement of the hand lever 23 over its quadrant 25. Consequently, the device will operate to cause the motor 27 to rotate in a direction corresponding to the direction of movement of the hand lever 23 and through a distance corresponding to the distance said hand lever is moved.

Should the operator desire to cause the rock-shaft 16 to rotate counterclockwise, he will move the hand lever 23 forwardly along the quadrant 25, imparting clockwise movement to the lever 21 and rearward movement to the follower member 99 whereby the pin 106 will be cammed downwardly from the neutral mid position within the diagonal slot portion 104. This will move the rod 107 downwardly, pivoting the bell-cranks 108 and 109 clockwise and moving the rod 110 to the right, engaging the contacts 73 and 74. As explained above, engagements of the contacts 73 and 74 cause the motor to rotate in the direction which incurs counterclockwise rotation of the rock-shaft 16. When this ensuing movement of the rock-shaft 16 has attained an amount corresponding to the movement of the hand lever 23, the cam slot 101 will have moved sufficiently far relatively to the pin 106 for reestablishing this pin in the neutral mid section of the diagonal cam slot portion 104, moving the contact 74 back to its disengaged position between the contacts 72 and 74.

The amount of pivotal movement of the bell-cranks 108 and 109 and consequently the amount of movement of the contact 74 toward either of the contacts 72 and 73, is determined by the diagonal pitch and length of the slot portion 104. Subsequent to the pin 106 reaching either end of the slot portion 104, this pin 106 is simply moved idly endwise in the slot portions 102 or 103 without pivoting the bell-cranks 108 or 109 and without moving the contact 74. Movement of the cam follower pin 106 more distantly into either of the cam slot portions 102 or 103, by manually moving the hand lever 23 at such a speed that the pin 106 moves endwise of these slot portions 102 and 107 at greater speed than the cam plate 69 is advanced axially of the countershaft 63 by operation of the motor, results in correspondingly more distinct rocking of the rockshaft 16 before the neutral mid portion of the diagonal cam slot can overtake the cam follower pin 106 for stopping the motor.

When it is desired to employ the motor 27 for cranking the tractor engine, the gear shift lever 39 will be manipulated for shifting the gear 35 rearwardly out of mesh with the gear 41 and into mesh with the countershaft gear 42 and thereafter the hand lever 23 is pulled backwardly. This will cause the cam follower 99 to ride upwardly on the lower edge of the cam slot portion 104 to engage the contacts 72 and 74. From the above description it is apparent that this engagement of the contacts 72 and 74 causes the motor armature shaft 34 to rotate clockwise whereby the gear 42 and the shafts 44 and 47 will be rotated counterclockwise, as viewed from their front ends, for projecting the pinion 59 into mesh with the starter gear 43 on the engine fly-wheel. Continued operation of the motor 27 will cause the pinion to rotate the gear 43 for cranking the engine. Upon the engine commencing to run under its own power, the peripheral speed of the gear 43 and of the pinion 59 will exceed that of the shaft 47 whereby the pinion will be spun counterclockwise upon the threaded shaft section 58 and projected out of mesh with the gear 43. Also upon starting of the engine the operator will move the hand lever 23 forwardly for moving the cam follower pin 106 rearwardly and downwardly to the neutral mid position in the slot portion 104 for disconnecting the contacts 72 and 74.

Instead of employing the system illustrated in Fig. 2 of employing fixed contacts 72 and 73 with a movable contact 74 and a device 71 for controlling movement of the contact 74 in opposite directions for selective contact with the contacts 72 and 73, an arrangement may be employed similar to that illustrated in Figs. 5 and 6. In this second form of electric circuit control, contacts 72$^a$ and 73$^a$ corresponding respectively to the contacts 72 and 73 (hereinafter all reference characters with the suffix $a$ designate parts respectively corresponding to those parts in the lower numbered figures which are designated by the same reference character without the suffix) are carried upon an arm 110 mounted upon a casing wall boss 111 for rotation coaxially with the rock-shaft 16$^a$. These contacts 72$^a$ and 73$^a$ are insulated from one another and from said arm 110 by a block of insulating material 112 to which they are secured. A contact 74$^a$ is carried by one of the rock-shaft arms 17$^a$. This contact 74$^a$ is suitably insulated from the metal arm 17$^a$ and is mounted therein for endwise movement within a recess 113. A spring 114 in the bottom of the recess reacts against the adjacent end of an insulating material carrier 115 for said contact 74$^a$ for constantly urging this contact against the insulating body 112 or the contacts 72$^a$ or 73$^a$ with whichever it happens to be in registry. The outer faces of the contacts 72$^a$ and 73$^a$ are flush with the outer face of the insulating body 112 so the contact 74$^a$ can slide freely over these faces.

Contacts 72$^a$ and 73$^a$ are for connection with the conductors 78 and 79 of Fig. 4, while the contact 74$^a$ is for connection with the conductor 81 in Fig. 4. The circumferential position of the arm 110, carrying the contacts 73$^a$ and 72$^a$ about the rock-shaft axis, is controlled manually by a rod 24$^a$. When the operator desires the electric motor 27 to cause the rock-shaft 16$^a$ to rock clockwise as viewed in Fig. 5, he will impart forward movement to the rod 24$^a$ and clockwise movement of the arm 110 for carrying the contact 72$^a$ into engagement with the contact 74$^a$. when this occurs, the electromagnetic device 76 will be energized, as described hereinabove, for incurring the clockwise rotation of the rock-shaft, and upon the rock-shaft rocking a distance clockwise corresponding to the manual clockwise movement of the arm 110, the contact 74$^a$ will have been moved out of engagement with the contact 72$^a$ causing the electric motor and said rock-shaft to stop. Manual movement of the arm 110 counterclockwise will carry the contact 73$^a$ into engagement with the rock-shaft carried contact 74$^a$, causing energization of the electromagnetic device 77 and counterclockwise rocking of the rock-shaft 16$^a$ until such time as this rock-shaft rocks a distance corresponding to the manual movement of the arm 110, whereupon the contact 74 will be carried out of engagement with the contact 73$^a$ for stopping the motor and the rock-shaft.

I claim:

1. In an electric power device for use upon an engine-driven vehicle having an engine-starting gear and a source of electric energy; the combination of an electric engine-starting motor energizable for operation in reverse directions when selectively electrically connected with the energy source, an oppositely movable work member to be driven by said motor, driving connection means selectively establishable in driving relation between the motor and said starting gear and between the motor and said work member, electric circuit means connectable between the source and motor to effect such energization thereof, said electric circuit means including switch contacts closable in one combination for causing motor operation in one direction and closable in another combination for causing motor operation in the opposite direction, and a contact controlling means including cooperable elements independently movable for adjusting such contact controlling means in controlling the closing and opening of said contacts, said contact controlling means having a neutral setting wherein neither combination of contacts is closed, one of said elements being manually movable to adjust said controlling means for effecting closing of either combination of contacts and thereby incurring ensuing movement of said work member when the driving connection is established between the motor and said work member, and connecting means connecting the other of said elements with said work member for movement therewith in the direction and amount to reestablish the neutral setting coincidently with such work member moving an amount correlated with the amount of manual movement of the one element in the direction effecting the contact closing adjustment.

2. In an electric power device for use upon an engine-driven vehicle having an engine-starting gear and a source of electric energy; the combination of an electric engine-starting motor energizable for operation in reverse directions when selectively electrically connected with said energy source, an oppositely movable work member, driving connection means selectively establishable in driving relation between the motor and starting gear or between the motor and said work member, electric circuit means connectable between the source and motor to effect energization of the motor and including switch means susceptible of one manipulation to connect the circuit for causing motor operation in one direction and susceptible of another manipulation to connect the circuit for causing motor operation in the opposite direction, and switch operating means including cooperable independently adjustable cam and cam follower elements, said elements having a neutral setting wherein said switch operating means is set to incur neither switch manipulation, one of said elements being manually adjustable to set the switch operating means for effecting either switch manipulation and thereby incurring ensuing movement of said work member when the driving connection is established between the motor and said work member, and the other of said elements being connected with said work member for movement with the ensuing movement thereof and in the direction and amount to reestablish the neutral setting upon such member moving an amount correlated with the amount of manual adjustment of the one element.

3. In a tractor having a forward body portion carrying an engine and a starting gear therefor, a rear body portion with traction wheels, and an intermediate body portion; an electric power device carried by the intermediate body portion, said power device including an electric motor energizable for operation in reverse directions, electric circuit connections for controlling energization of said motor and selectively adjustable between a neutral setting incurring motor quiescence and alternative drive settings incurring motor drive in respective opposite directions, a rock-shaft mounted on and transversely of the tractor at the intermediate body portion, driving means adjustable for selectively drivingly connecting the motor with the rock-shaft and the engine starting gear, and circuit adjusting means manipulatable from a neutral condition wherein the electric circuit is set in neutral into alternative conditions to respectively establish the alternative circuit settings, a control member manually operable to obtain any of the circuit adjusting means conditions, and automatic control means operable coordinately with movement of the rock-shaft to reestablish the neutral condition of said circuit adjusting means incident to the rock-shaft rocking in a direction and amount correlated with the direction and amount of movement of the manual control member in causing such rocking.

4. In a tractor having a forward body portion carrying an engine with a starting gear, a rear body portion with traction wheels and an intermediate body portion; an electric power device comprising a casing mounted on the intermediate tractor body portion, a starting gear driving shaft in said casing, a driving connection between said shaft and the starter gear, a rock-shaft journaled in said casing, a reversibly drivable electric motor mounted on said casing, means for selectively establishing a driving connection between the motor and the rock-shaft or the starter gear driving shaft, an electric circuit for energizing said motor, and circuit connecting means comprising a component manually movable to selectively establish connections of said circuit incurring drive of the motor in either direction, and said circuit connecting means also comprising a component movable coordinately with said rock-shaft to disconnect the circuit incident to the rock-shaft rocking in a direction and amount correlated with the direction and amount of movement of the manually-moved component in causing such rocking.

5. In a tractor having a forward body portion carrying an engine with a starting gear, a rear body portion with traction wheels and an intermediate body portion; an electric power device carried by said intermediate body portion and comprising a starter gear driving shaft extending longitudinally of the tractor and drivingly connected with said starter gear, a rock-shaft disposed transversely of such intermediate body portion, a reversibly drivable electric motor, means for selectively establishing a driving connection between the motor and the rock-shaft or the starting gear driving shaft, an electric circuit for energizing said motor, and circuit connecting means comprising a component manually movable to selectively establish connections of said circuit incurring drive of the motor in either direction, and said circuit connecting means also comprising a component movable coordinately with said rock-shaft to disconnect the circuit incident to the rock-shaft rocking in a direction and amount correlated with the direction and amount of movement of the manually-moved component in causing such rocking.

6. In an auxiliary power device for a tractor having a source of electric energy and an engine-starting gear, a starting gear driving shaft drivingly connected with said starting gear, a rock-shaft journaled on the tractor, a reversibly drivable electric motor, means for selectively establishing a driving connection between the motor and the rock-shaft or the starting gear driving shaft, an electric circuit connectable between the electric energy source and the motor for energizing the latter, and circuit connecting means comprising a component manually movable to selectively establish connections of said circuit incurring drive of the motor in either direction, and said circuit connecting means also comprising a component movable coordinately with said rock-shaft to disconnect the circuit incident to the rock-shaft rocking in a direction and amount correlated with the direction and amount of movement of the manually-moved component in causing such rocking.

7. In an auxiliary power device for a tractor having a source of electric energy and an engine-starting gear, a starting gear driving shaft journaled on the tractor for rotation about a fore and aft axis and drivingly connected with said starting gear, a rock-shaft journaled on the tractor for rocking motion about an axis extending transversely of the tractor, a rock-shaft driving arm with which the rock-shaft is constrained to rock, a traveling nut drivingly associated with said arm, a threaded shaft journaled in parallelism with the starting gear drive shaft and meshed with said nut to advance or retract the same according to the direction such shaft is driven and to correspondingly rock the rock-shaft in one direction or the other, a reversibly drivable electric motor, means for selectively establishing a driving connection between the motor and either of said shafts, an electric circuit connectable between the electric energy source and the motor for energizing the latter, and circuit connecting means comprising a component manually movable to selectively establish connections of said circuit incurring drive of the motor in either direction, and said circuit connecting means also comprising a component movable coordinately with said rock-shaft to disconnect the circuit incident to the rock-shaft rocking in a direction and amount correlated with the direction and amount of movement of the manually-moved component in causing such rocking.

8. In a tractor having a forward body portion carrying an engine with a starting gear, a rear body portion with traction wheels and an intermediate body portion; an electric power device comprising a casing mounted on the intermediate tractor body portion, a starting gear driving shaft journaled in said casing for rotation about an axis extending fore and aft of the tractor, universally articulate means drivingly connecting said shaft with the starting gear, a rock-shaft journaled in said casing transversely of the starting gear shaft, a rock-shaft driving arm in said casing and with which the rock-shaft is constrained to rock, a traveling nut drivingly associated with said arm, a threaded shaft journaled in the casing in parallelism with the starting gear driving shaft and meshed with said nut to advance or retract the same according to the direction the threaded shaft is rotated and to correspondingly rock the rock-shaft in one direction or the other, a reversibly drivable electric motor mounted on said casing, means in the casing for selectively establishing a driving connection between the motor and either of said shafts, an electric control circuit connectable for supplying electric energy to the motor for energizing the same, and circuit connecting means comprising a component manually movable to selectively establish connections of said circuit incurring drive of the motor in either direction, and said circuit connecting means also comprising a component movable coordinately with said rock-shaft to disconnect the circuit incident to the rock-shaft rocking in a direction and amount correlated with the direction and amount of movement of the manually-moved component in causing such rocking.

9. In an electric power device for use upon an engine-driven vehicle having an engine-starting gear and a source of electric energy; the combination of an electric engine-starting motor energizable for operation in reverse directions when selectively electrically connected with the energy source, an oppositely movable work member to be driven by said motor, driving connection means selectively establishable in driving relation between the motor and said starting gear and between the motor and said work member, and electric circuit means connectable between the source and motor to effect such energization thereof, said electric circuit means including switch contacts closable in one combination for causing motor operation in one direction and closable in another combination for causing motor operation in the opposite direction.

10. In an electric power device for use upon an engine-driven vehicle having an engine-starting gear and a source of electric energy; the combination of an electric engine-starting motor energizable for operation in reverse directions when selectively electrically connected with the energy source, an oppositely movable work member to be driven by said motor, driving connection means selectively establishable in driving relation between the motor and said starting gear and between the motor and said work member, electric circuit means connectable between the source and motor to effect such energization thereof, said electric circuit means including switch contacts closable in one combination for causing motor operation in one direction and closable in another combination for causing motor operation in the opposite direction, and means operable responsive to movement of said work member for disconnecting said circuit means.

11. In an electric power device for use upon an engine-driven vehicle having an engine-starting gear and a source of electric energy; the combination of an electric starting motor energizable for operation when electrically connected with the energy source, a work member to be driven by said motor, driving connection means selectively establishable in driving relation between the motor and said starting gear and between the motor and said work member, and electric circuit means connectable between the source and motor to effect such energization thereof, said electric circuit means including switch contacts closable for causing motor operation.

12. In an electric power device for use upon an engine-driven vehicle having an engine-starting gear and a source of electric energy; the combination of an electric starting motor energizable for operation when electrically connected with the energy source, a work member to be driven by said motor, driving connection means selectively establishable in driving relation between the motor and said starting gear and between the motor and said work member electric circuit means connectable between the source and motor to effect such energization thereof, said electric circuit means including switch contacts closable for causing motor operation, and means operable in response to movement of said work member for disconnecting said circuit means.

13. In an electric power device for use upon an engine-driven vehicle having an engine-starting gear and a source of electric energy; the combination of an electric starting motor energizable for operation when electrically connected with the energy source, a work member to be driven by said motor, driving connection means selectively establishable in driving relation between the motor and said starting gear and between the motor and said work member, electric circuit means connectable between the source and motor to effect such energization thereof, said electric circuit means including switch contacts closable for causing motor operation, means advanceable for closing said contacts, and means operable responsively to ensuing movement of said work member and to the amount of advancement of said contact closing means for disconnecting said circuit.

14. In an electric power device for use upon an engine-driven vehicle having a source of electric energy; the combination of an electric motor energizable for operation when electrically connected with the energy source, a work member to be driven by said motor, driving connection means for driving the work member from said motor, electric circuit means connectable between said energy source and the motor to effect such energization thereof, said electric circuit means including means for establishing its said connection between the motor and source, means manually advanceable for operating said circuit establishing means, and means operable responsively to ensuing movement of said work member and to the amount of advancing of said manually advanceable means for interrupting the establishment of said circuit.

CARL W. MOTT.